United States Patent [19]

Goodwine

[11] Patent Number: 4,469,186

[45] Date of Patent: Sep. 4, 1984

[54] CRAWLER TO BASE FRAME CONNECTION

[75] Inventor: Paul C. Goodwine, Lima, Ohio

[73] Assignee: Kidde, Inc., Clifton, N.J.

[21] Appl. No.: 381,229

[22] Filed: May 24, 1982

[51] Int. Cl.³ ............................................. B62D 55/10
[52] U.S. Cl. ..................................... 180/9.1; 180/9.48
[58] Field of Search .................. 180/9.2 R, 9.48, 9.42, 180/9.52, 9.2 C, 9.26; 292/101, 106; 52/111, 117, 118

[56] References Cited

U.S. PATENT DOCUMENTS

| | | | |
|---|---|---|---|
| 3,267,625 | 8/1966 | Holzschuh et al. | 52/111 |
| 3,712,398 | 1/1973 | Althaus | 180/9.48 |
| 3,757,881 | 9/1973 | Short et al. | 180/9.2 R |
| 4,000,784 | 1/1977 | Morrow, Sr. et al. | 180/9.48 |
| 4,014,400 | 3/1977 | Cline et al. | 180/9.2 R |

Primary Examiner—Joseph F. Peters, Jr.
Assistant Examiner—D. Lynn Fugate

Attorney, Agent, or Firm—Brady, O'Boyle & Gates

[57] ABSTRACT

The base frame of a crawler truck for cranes or similar heavy equipment is provided on at least two opposite sides with projecting heavy attachment plates which coact with support structures projecting in an opposite direction from the side frames of self-contained crawler assemblies requiring attachment to the truck base frame. The side projecting structures of the crawler frames include permanent upper mounting pins and lower mounting openings. The upper pins rest within seating notches formed in the heavy attachment plates of the truck base frame and the lower mounting openings receive reciprocatory lower mounting and locking pins of the crawler assemblies, which pins are connected with power-actuators on the crawler assemblies. Safety latches prevent premature withdrawal of the lower pins from their mounting and locking positions. Awkward and tedious alignment problems are avoided.

5 Claims, 8 Drawing Figures

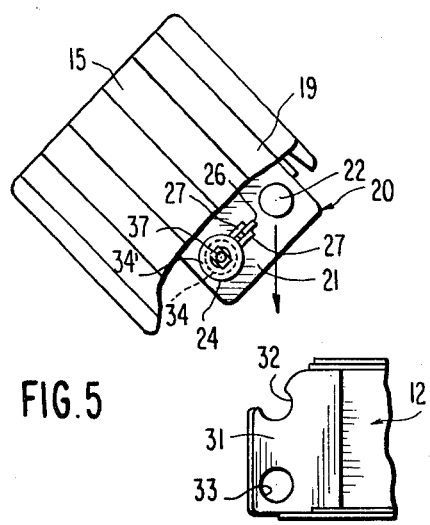
FIG.5
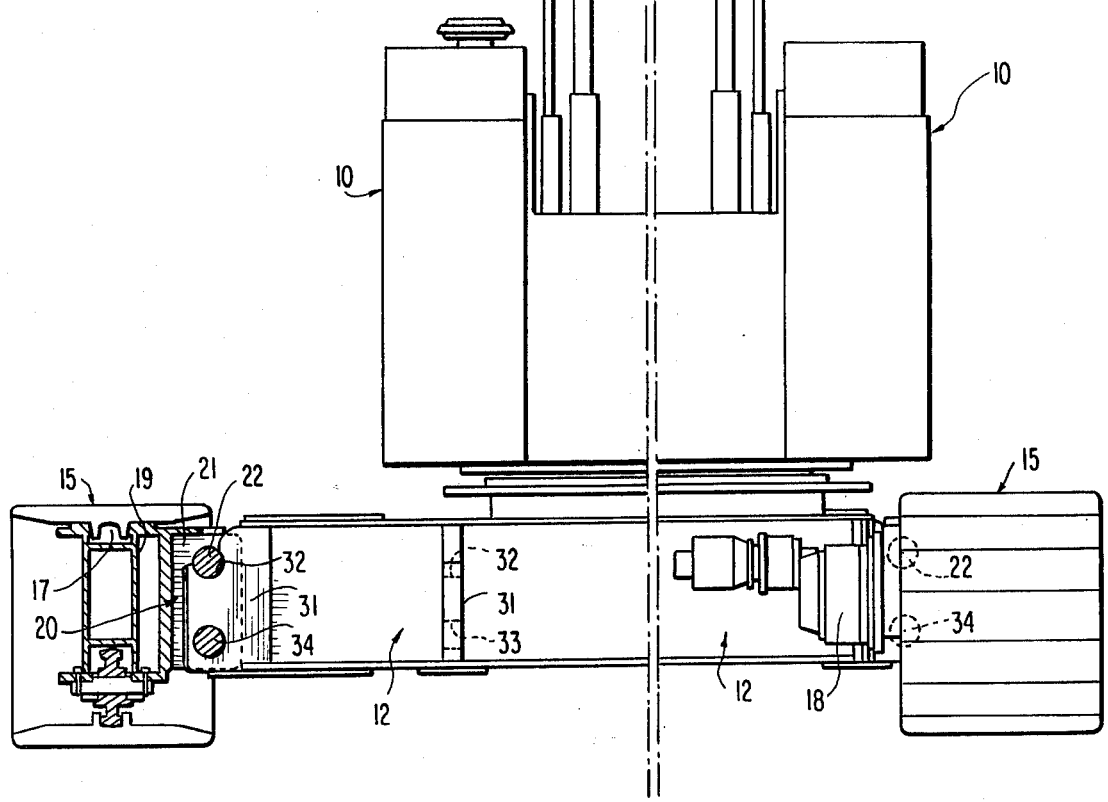
FIG.4a  FIG.4b

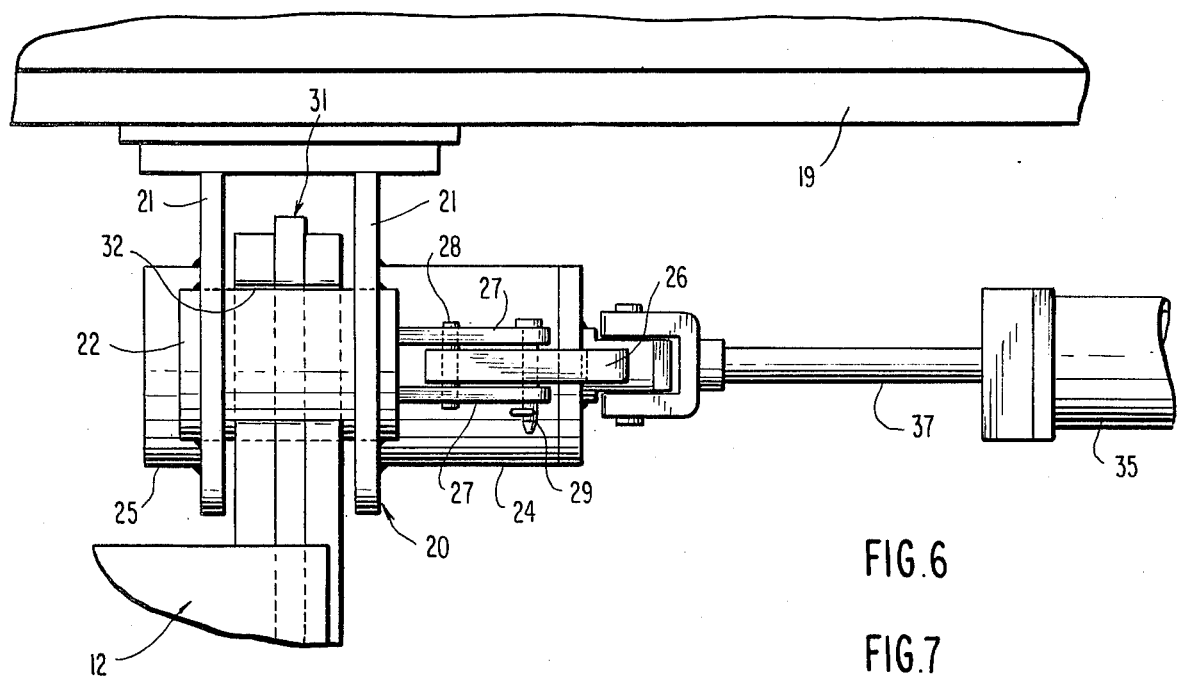
FIG.6
FIG.7
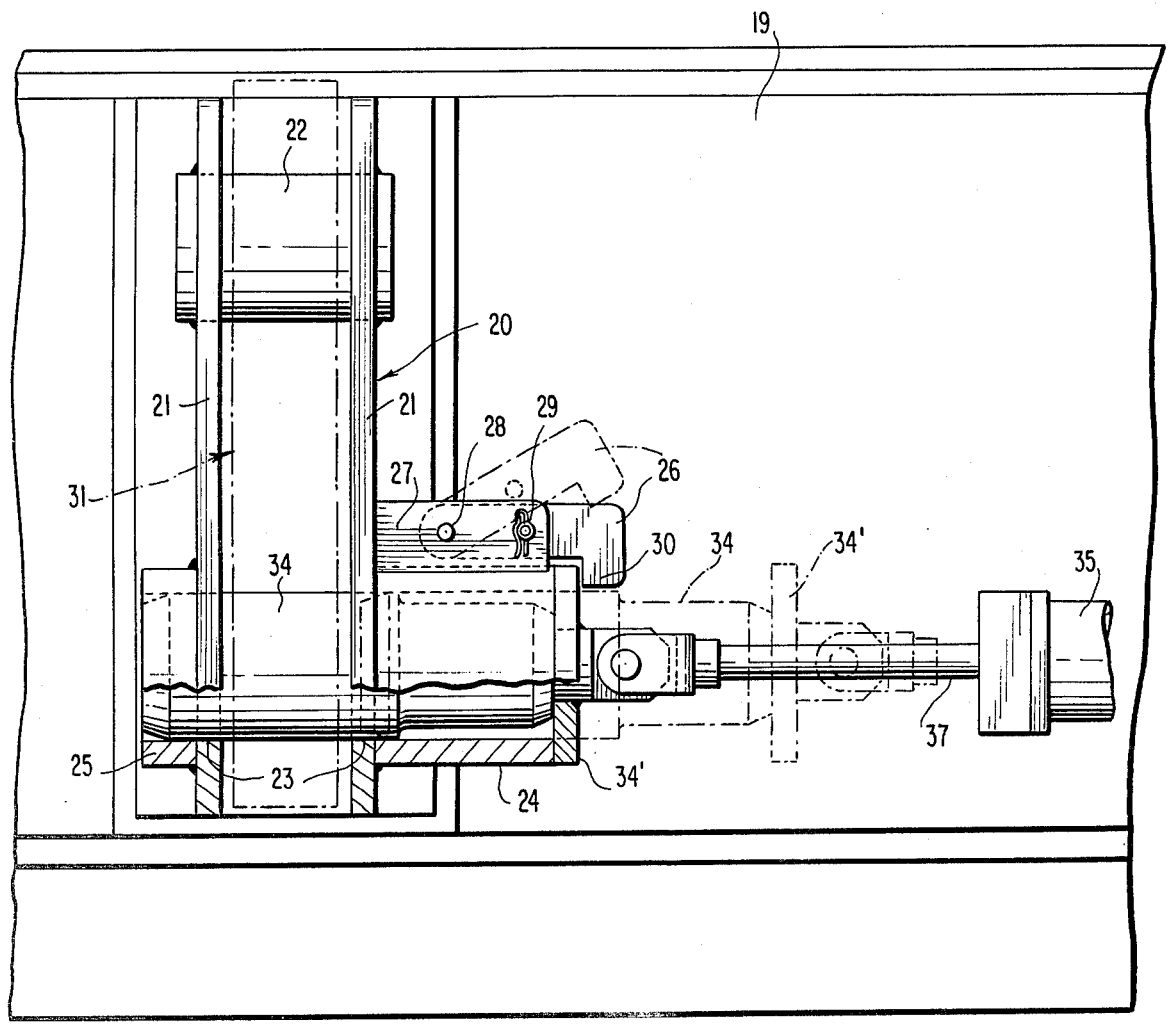

CRAWLER TO BASE FRAME CONNECTION

BACKGROUND OF THE INVENTION

The objective of this invention is to provide a more simplified and much less awkward connection between the crawler assemblies and base frames of heavy equipment crawler trucks. Heretofore, as exemplified by U.S. Pat. No. 3,757,881 and others, replaceable self-contained crawler assemblies are connected with chosen sides of a rectangular truck base frame by utilizing heavy mounting pins which require placement within bored openings of the crawler assembly frames and the base frame. This assembly procedure of the prior art presents serious alignment problems which are costly and difficult to deal with. The heavy mounting pins must also be locked near their opposite ends with locking devices on the crawler assembly frames and the truck base frame.

The present invention entirely eliminates these costly problems of the prior art by providing a simpler, more secure and much more convenient arrangement for connecting the crawler assemblies to opposite sides of the truck base frame. The main operational components including power-operated lower pins of the crawler assemblies are in clear view at the interior sides of the crawler assemblies. The upper mounting pins rest securely in seating notches formed in the side attachment plates of the truck base frame in such a way that no bothersome alignment problem for the lower power-operated reciprocating pins is present after the upper pins have been placed in the seating notches and the crawler assemblies have been allowed to move to their positions for receiving the lower pins. The invention saves a great deal of time and labor in the process of connecting the crawler assemblies to the truck base. The resulting connection is safe and secure and a safety latching means is provided to preclude premature or accidental withdrawal of the lower mounting pins.

Other features and advantages of the invention will become apparent to those skilled in the art during the course of the following description.

BRIEF DESCRIPTION OF THE DRAWINGS

FIG. 4a and FIG. 4b are end elevational views, partly in section, showing crawler assemblies attached through the connections embodying this invention with the narrow and wide sides, respectively, of the rectangular base frame.

FIG. 5 is an exploded fragmentary elevational view depicting the placement of one crawler assembly into connected relationship with the attachment plate provided at one side of the base frame.

FIG. 6 is an enlarged fragmentary plan view, partly in section with parts omitted, of a connection between the base frame and one crawler assembly.

FIG. 7 is a fragmentary side elevation of the same.

DETAILED DESCRIPTION

Figure 1:
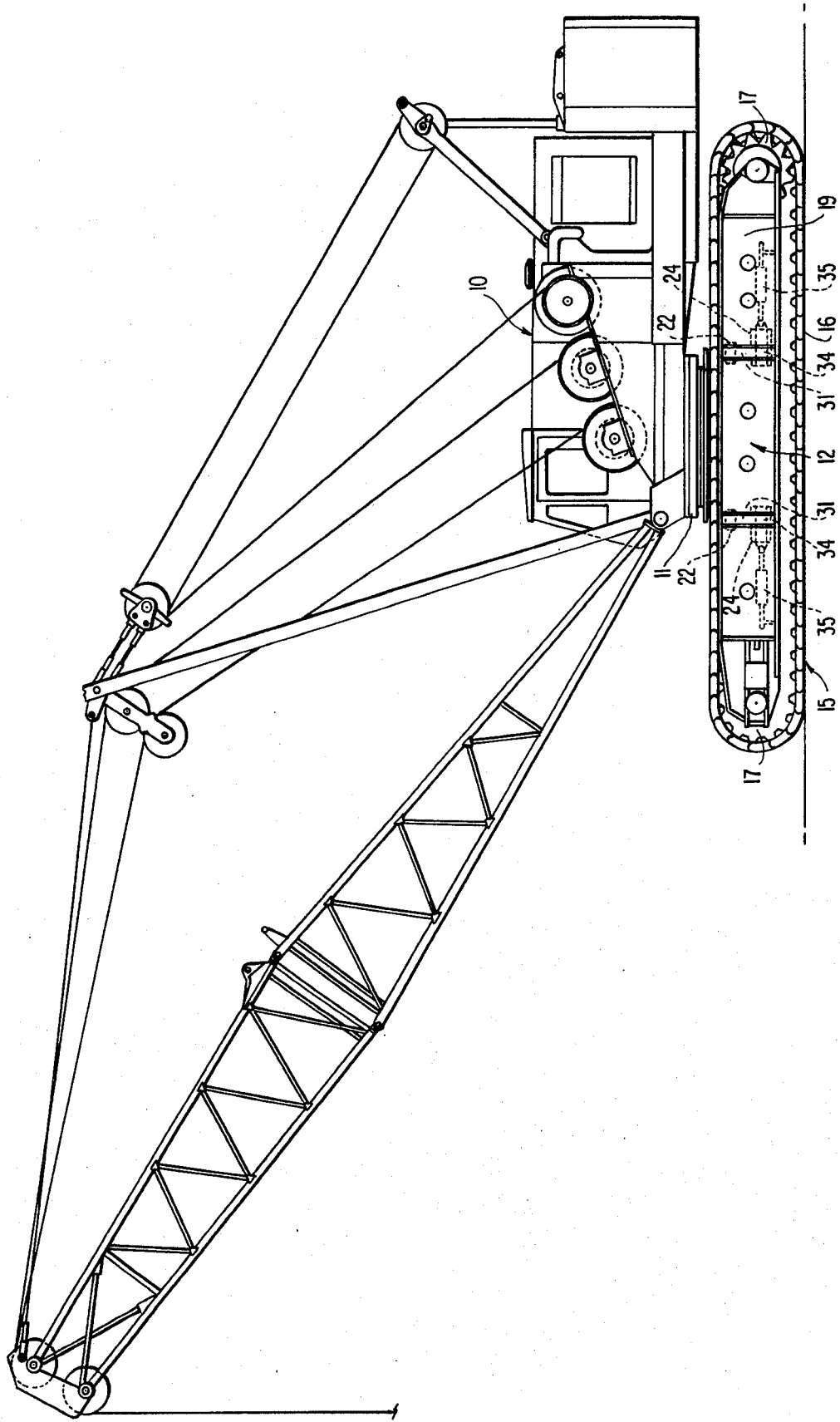
FIG. 1 is a side elevation of a crawler crane whose crawler assemblies are attached to a base frame by the connecting means forming the subject matter of the invention.
Figure 2:
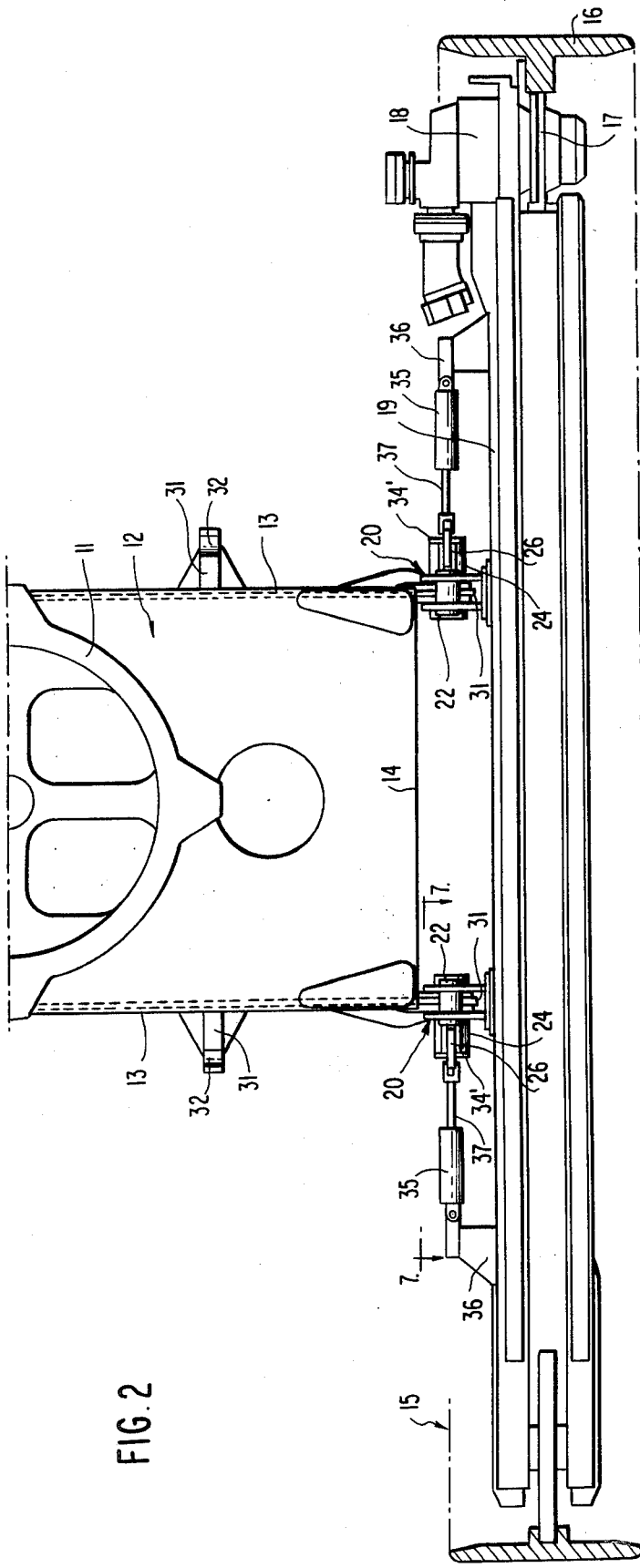
FIG. 2 is a fragmentary plan view, partly in section, showing a base frame and a crawler assembly attached to one narrow side thereof.
Figure 3:
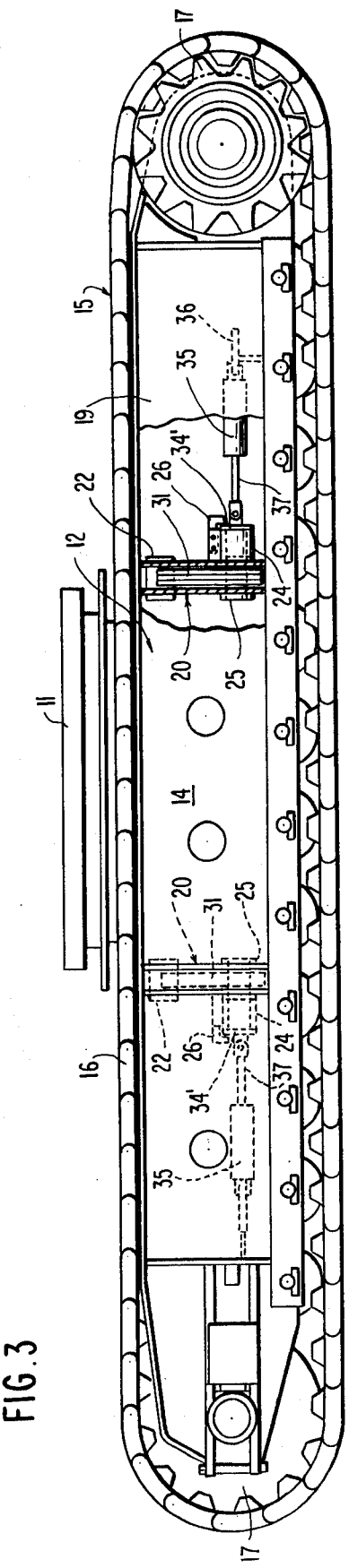
FIG. 3 is a side elevation of the elements in FIG. 2.

Referring to the drawings in detail wherein like numerals designate like parts, a crawler crane includes a superstructure 10 mounted on a turntable 11 supported by a rectangular horizontal base frame 12 having long sides 13 and short ends 14, as disclosed in U.S. Pat. No. 3,757,881. In this connection it should be understood that the invention, while fully suitable for satisfying the objectives stated in the above patent, has much broader application for attaching crawler assemblies to any type of truck base frame. For the purpose of illustration only, the drawings in FIGS. 1 through 3 depict self-contained crawler assemblies 15 attached by means forming the subject matter of the invention to the short ends 14 of rectangular base frame 12. FIGS. 4a and 4b, however, show the crawler assemblies 15 attached, respectively, to the short end and wide side of the base frame 12 to form a wide stance and narrow stance crawler truck, as need dictates.

Each self-contained crawler assembly 15 includes a crawler track 16 of conventional construction engaged with sprockets 17 and conventionally supported between the sprockets. At least one sprocket 17 is powered by a hydraulic motor 18 having conventional controls, not shown. Each crawler assembly further comprises an interior side frame 19 having fixed secured thereto and projecting inwardly therefrom in predetermined spaced relationship mounting structures 20. Each such mounting structure consists of a pair of parallel spaced vertical mounting plates 21 forming parts of a strong welded assembly. Near their tops, the plates 21 have fixed thereto and extending therebetween permanent short cylindrical mounting pins 22, whose function will be described. Near their lower ends in vertical alignment with the pins 22 when the assembly of the crawler truck is completed, the plates 21 have openings 23 formed therethrough in coaxial alignment. A sleeve 24 and a collar 25 are welded to the outer faces of the plates 21 with their bores coaxially aligned with the plate openings 23.

A safety latch element 26, whose purpose will be described, is pivoted between two fixed lug plates 27 atop the sleeve 24 by a transverse pivot pin 28, enabling the latch 26 to swing vertically from a locking horizontal position, FIG. 7, to a raised position, as required. The latch 26 is locked in the active horizontal position by a cotter pin 29 or the like. It has a depending nose 30 as shown in FIG. 7.

The base frame 12 is provided near the ends of its narrow sides 14 with thick and very sturdy vertical mounting plates 31 which can engage closely between the paired plates 21. At their upper corners, the mounting plates 31, which are securely welded to the base frame 12, having arcuate seating notches 32 adopted to receive and stably support the upper mounting pins 22 of crawler assemblies 15. The notches 32 have their open sides facing upwardly on diagonal axes across the plates 31. Near their lower ends in vertical alignment with the centers of seating notches 32, the plates 31 have openings 33 of the same diameter as the openings 23 and the bores of sleeve 24 and collar 25. When the mounting structures 20 receive the plates 31 between the two plates 21, the permanent pins 22 enter the seating notches 32 and are solidly supported therein. Following this, the crawler assembly 15 which can be handled by a construction crane is allowed to rotate around the axis of pin 22 until openings 23 are in coaxial alignment with opening 33.

At this time, lower reciprocatory mounting and locking pins 34, two on each crawler assembly 15, are actuated by power cylinders 35 which lie inwardly of and parallel to the side frames 19 of the crawler assemblies. The cylinder bodies of these units are attached to brackets 36 carried by the side frames 19 while the rods 37 are directly connected with pins 34 to extend and retract the latter.

The seating of permanent pins 22 in notches 32 prior to placing the lower pins 34 in their active support and locking positions to a great extent eliminates the previously-discussed alignment problems with the structures of U.S. Pat. No. 3,757,881 and other known prior art. That is to say, once the upper permanent pins 22 are seated in the notches 32, the openings 23 with the bores of sleeve 24 and collar 25 will swing into precision alignment with the opening 33 to receive the lower pins 34. The pins 34 and their actuating cylinders 35 are parallel to the axes of upper permanent pins 22 and are parallel to the horizontal axes of crawler assemblies 15, rather than across these assemblies, as in the prior art.

When the lower pins 34 are "home" within the bores of sleeve 24 and collar 25 and through the openings 33 and plates 31, the pivoted safety latches 26 are placed with their locking noses 30 at the rear ends of enlarged diameter flanges 34' connected at the rear ends of the pins 34 and the cotter pins 29 are placed to secure the latches 26 against premature release. As long as the latches 26 are held in their active positions, it is impossible to withdraw the lower pins 34 from their support and locking positions relative to the crawler assemblies 15.

To separate each assembly 15 from the truck base frame 12, all that is required is the release of latches 26, followed by withdrawal of the lower pins 34 and lifting off of the assemblies 15 by a crane. The procedure of installing and removing crawler assemblies on very heavy equipment is rendered much more convenient and less costly by the invention.

It will be appreciated that additional mounting plates 31 having notches 32 may be provided on the wide sides 13 of base frame 12 to enable attachment of the crawler assemblies 15 in either of two ways described in U.S. Pat. No. 3,757,881. It should be understood, however, that the invention is in no way restricted in its use to this particular advantageous arrangement with the rectangular base frame 12 of the crawler crane 10 illustrated in the drawings. The invention may be utilized to mount selfcontained crawler assemblies on other types of heavy equipment having other forms of base frames.

In its essence, therefore, the present invention involves providing on at least two opposite sides of a base frame 12 of heavy equipment the vertical mounting plates 31 having upper notches 32 and lower locking pin openings 33. It also includes providing on the interior sides of crawler assemblies 15 the coacting vertical interfitting mounting structures 20 having upper permanent pins 22 to engage in seating notches 32 and lower locking pin openings 23 to register with openings 33. The invention also includes the horizontal longitudinal axis lower support and locking pins 34 across the axes of plates 31 and structures 20, the lower pins being power-operated and secured in place by safety latches 26.

It should be noted, as illustrated in the drawings, the power cylinders 35 are disposed near opposite ends of the crawler side frames 19 and therefore outwardly of the interfitting mounting members 20 and 31 on each side of the machine. The lower locking pins 34 being at the inner ends of the cylinders are in axially opposing relationship.

In some instances, the parts may be reversed, that is, the vertical mounting plates 31 having the upper notches 32 and lower locking pin openings 33 may be connected on the interior sides of the crawler assemblies 15, while the coacting vertical interfitting mounting structures 20 with the permanent pins 22 and the locking jaws 34 and the actuating elements therefor may be connected on the base frame 12. In such an arrangement, the orientation of the upper notches 32 may have to be somewhat different than shown, depending upon the type of equipment.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. In a crawler truck arrangement for heavy equipment, a base frame having opposite long sides and opposite short ends for the selective attachment of crawler assemblies thereto, spaced mounting members fixed to said opposite long sides and short ends of the base frame and having upper pin seating recesses and lower locking pin openings, coacting interfitting mounting members fixed to interior sides of the crawler assemblies and having upper permanent mounting pins adapted to enter said seating recesses and being supported therein and also having lower locking pin openings movable into registration with the first-named locking pin openings, a guide sleeve member on one side of the mounting member of the crawler assembly coaxially aligned with each lower locking pin opening of such member, lower mounting and locking pins disposed at the interior sides of said crawler assemblies parallel to the longitudinal axes thereof and being insertable through the guide sleeves and locking pin openings of the mounting members when such openings are in registration, and a pivoted safety latch element on said sleeve including a projecting nose engageable behind the rear end of the lower locking pin to block premature withdrawal of such pins and means to releasably lock the latch element in its active latching position relative to the lower locking pin, and power means on said crawler assemblies to operate said lower mounting and locking pins, whereby each crawler assembly and associated mounting members, mounting pins, locking pins and power means may be attached as a unit to a selected long side or short end of the base frame.

2. In a crawler truck arrangement for heavy equipment as defined in claim 1, and said power means comprising reciprocatory power cylinders coupled with the lower mounting and locking pins coaxially to extend and retract such pins.

3. In a crawler truck arrangement for heavy equipment as defined in claim 1, and said lower mounting and locking pins on each crawler assembly being in opposing coaxial relationship and across the interfitting mounting members of said base frame and crawler assemblies.

4. In a crawler truck arrangement for heavy equipment as defined in claim 3, and said mounting members of the base frame and crawler assemblies being vertically disposed and across the longitudinal axes of the crawler assemblies and projecting outwardly and inwardly respectively from the base frame and crawler assemblies.

5. In a crawler truck arrangement for heavy equipment as defined in claim 4, and said mounting members of the base frame comprising vertical plates and the coacting interfitting mounting members of the crawler assemblies comprising pairs of spaced parallel vertical plates adapted to straddle the base frame vertical plates, said upper permanent mounting pins being fixed to and extending between the spaced parallel vertical plates of said pairs.

* * * * *